United States Patent [19]

Kolinger et al.

[11] 4,100,965

[45] Jul. 18, 1978

[54] AUTOMOTIVE FAN SHROUD FOR SCREENING DEBRIS

[75] Inventors: Kenneth J. Kolinger, Riverside; Norman E. Williams, Park Ridge; Donald M. Earley, Glen Ellyn; William R. Golden, Bloomingdale, all of Ill.

[73] Assignee: International Harvester Company, Chicago, Ill.

[21] Appl. No.: 757,727

[22] Filed: Jan. 7, 1977

Related U.S. Application Data

[62] Division of Ser. No. 629,442, Nov. 6, 1975, Pat. No. 4,018,270.

[51] Int. Cl.² .................................................. F28F 19/00
[52] U.S. Cl. .................................. 165/119; 180/68 P; 165/134
[58] Field of Search ............... 165/95, 119; 180/68 R, 180/68 P; 55/267, 357, 481

[56] References Cited

U.S. PATENT DOCUMENTS

| | | |
|---|---|---|
| 2,325,913 | 8/1943 | McLemore, Jr. .................. 180/68 R |
| 2,576,316 | 11/1951 | Toth ..................................... 180/68 P |
| 2,796,141 | 6/1957 | Schreiner ............................ 165/119 |
| 3,755,995 | 9/1973 | Stickel ................................. 55/481 |
| 3,861,894 | 1/1975 | Marsh .................................. 55/357 |
| 3,980,132 | 9/1976 | Mitchell ............................. 180/68 R |

*Primary Examiner*—Charles J. Myhre
*Assistant Examiner*—Theophil W. Streule, Jr
*Attorney, Agent, or Firm*—John W. Gaines; Ronald C. Kamp; F. David AuBuchon

[57] ABSTRACT

Shroud, associated with a type of automotive fan and a vehicle radiator core, supports in a position between the fan and core an interposed debris screen which is slidable in guides in the shroud so as to be readily removable transversely out of the hood of an automotive vehicle for cleaning of the screen. Air enters the fan shroud under pressure by being blown in through fan opening means defined by the shroud at one end, and leaves under pressure in a path through radiator attachment means carried by the shroud at the other, or discharge, end. Intermediate the ends of the shroud, the debris screen is interposed with its plane between the respective planes of the opening means and attachment means, so as to screen all air being forced under pressure in the path therethrough.

6 Claims, 6 Drawing Figures

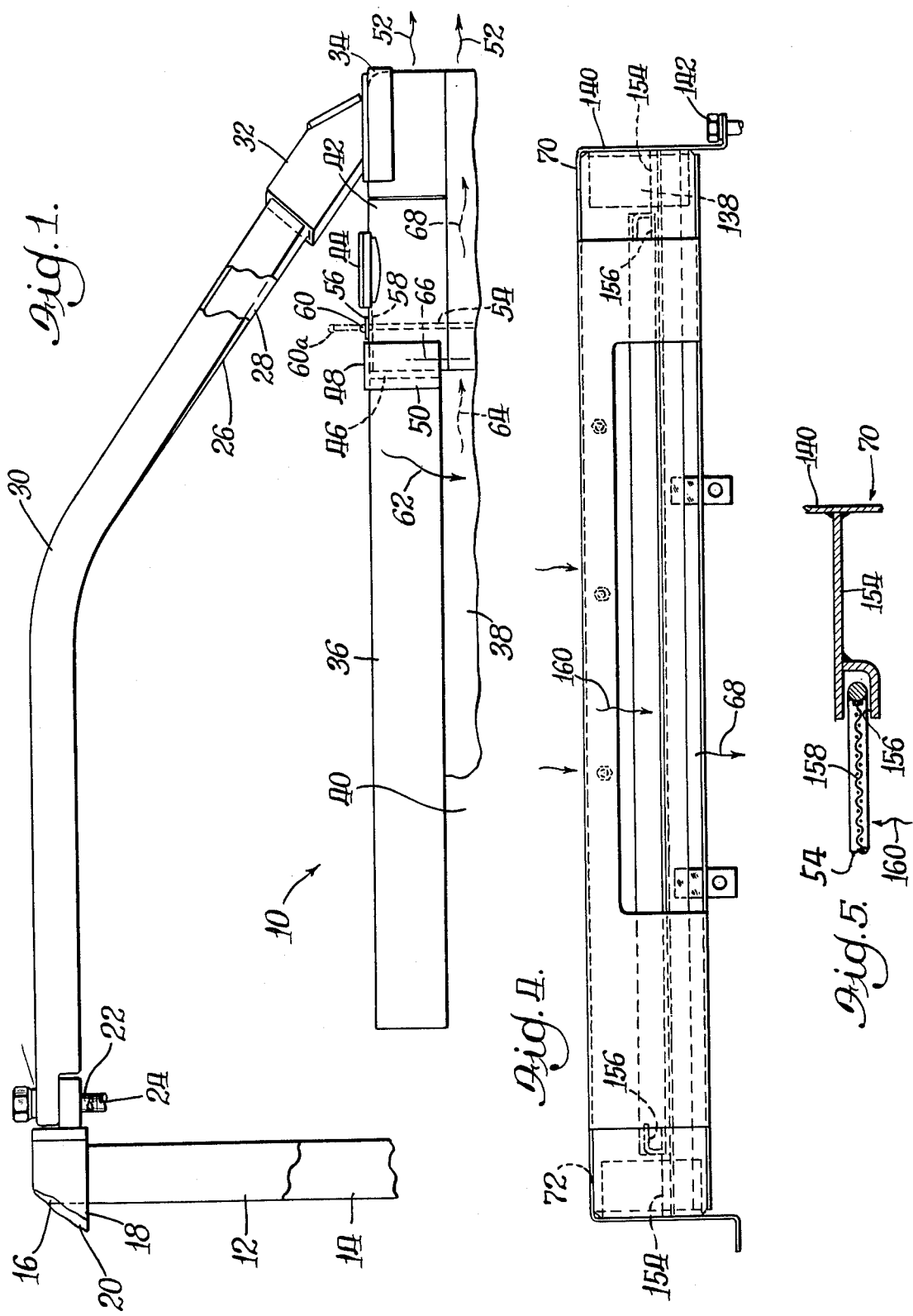

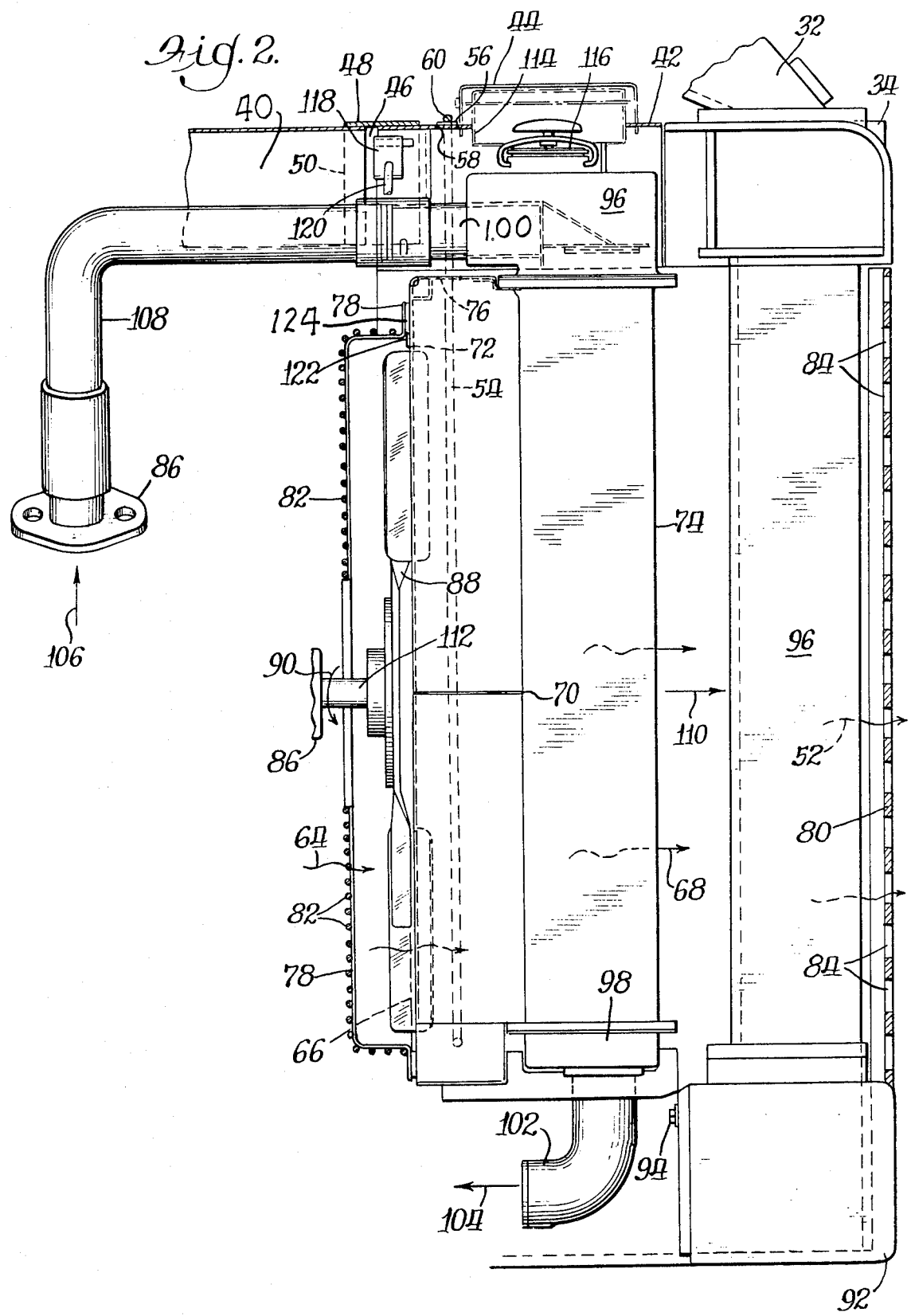

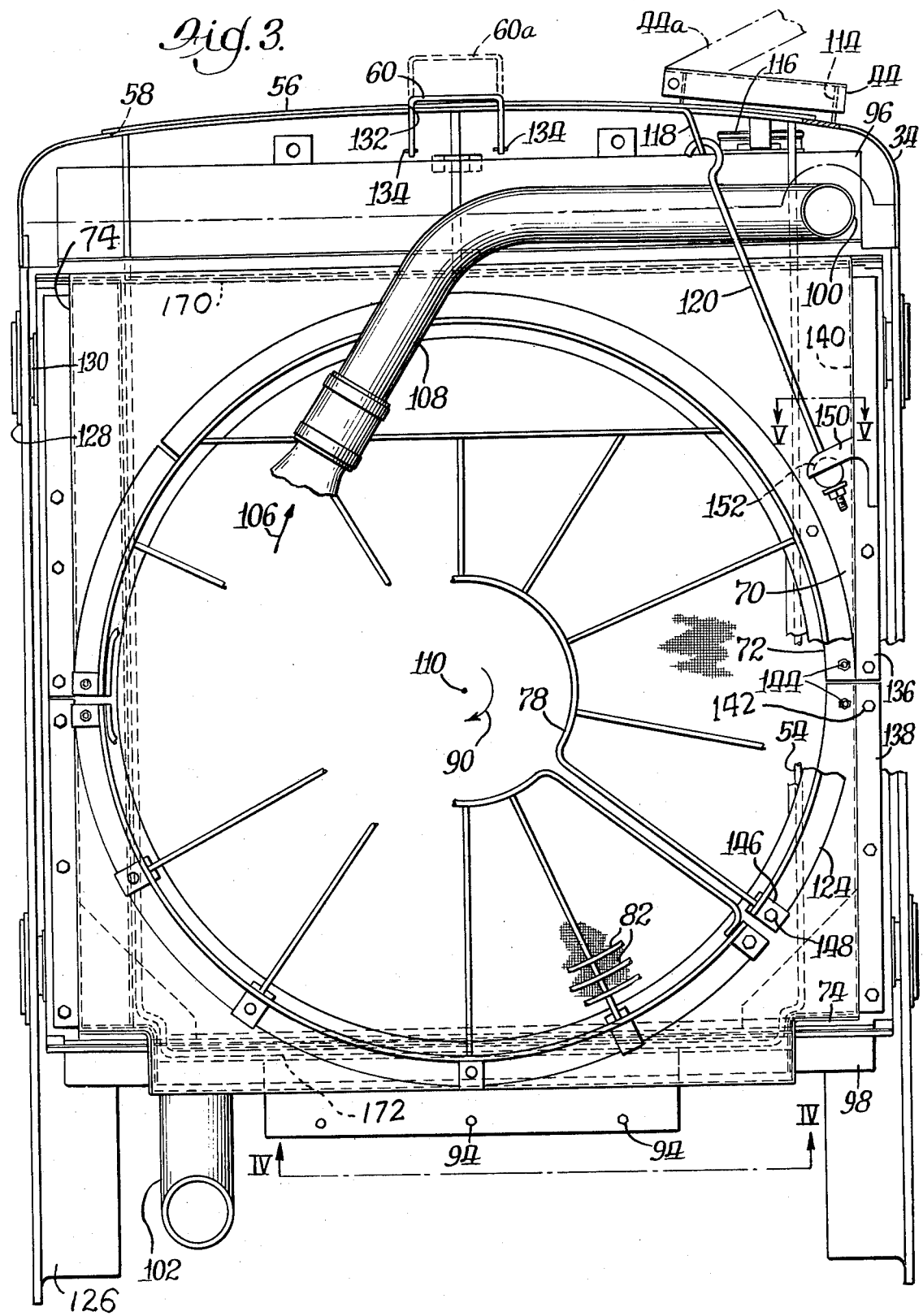

AUTOMOTIVE FAN SHROUD FOR SCREENING DEBRIS

This is a division of application Ser. No. 629,442 filed Nov. 6, 1975, now U.S. Pat. No. 4,018,270.

This application relates, in general, to an automotive fan shroud. More particularly, it relates to a fan shroud provided with screening to trap debris out of the flow of radiator cooling air induced by the fan.

In some cases, so called vehicle blower fans, which are located in a vehicle engine compartment and which direct cooling air flow toward and through a radiator in the vehicle, draw their air from the engine compartment which, in theory, is otherwise fully enclosed except for certain filtered-air openings in the hood of the vehicle. But this theoretical integrity of the engine compartment enclosure has the disadvantage of being difficult to sustain in various kinds of service, particularly severe tractor service under such stringent conditions as encountered in bulldozing in wooded areas, brush areas, land fill operations, dump grounds, and trash heaps. Areas of the engine compartment enclosure tend to become dented and scraped and torn from branches, falling limbs, and various objects encountered, and the drawback is that the blower fan is drawing in, through damaged compartment areas, leaking seams and joints, and various other leak openings which come into existence, air full of insects, excelsior, polyethylene and other film scraps, paint thinner, tree branches, brush, dirty motor oil, feathers, leaves, dirt, trash such as paper, sawdust, and other flying debris. The difficulty is that the blower fan thereupon impinges the airborne trash and liquids directly onto the vehicle radiator, reducing its cooling efficiency. That is, the radiator cooling fins become clogged and the free air flow passing through the radiator gets blocked, and flow is restricted.

Our invention to provide the fan shroud with a sliding screen materially reduces, if not substantially eliminating, the foregoing disadvantages, drawbacks, and difficulties, as will be explained in detail. Features, objects, and advantages will either be specifically pointed out or become apparent when, for a better understanding of our invention, reference is made to the following description taken in conjunction with the accompanying drawings, which show a preferred embodiment thereof, and in which:

FIG. 1 is a side elevational showing of the upper front portion of a tractor in the vicinity of its power unit guard and cooling structure, as viewed from the right side;

FIG. 2 is a side elevational showing, similar to FIG. 1 but viewed with the power unit guard and cooling structure exposed and shown in cross section;

FIG. 3 is a face elevational showing of the structure of FIG. 2, as viewed from the rear;

FIG. 4 is a bottom plan showing of the shroud present in said structure, as viewed in the direction of the arrows of the section line IV—IV appearing in FIG. 3;

FIG. 5 is a cross sectional view in top plan, taken along the section line V—V of FIG. 3.

Figure 6:
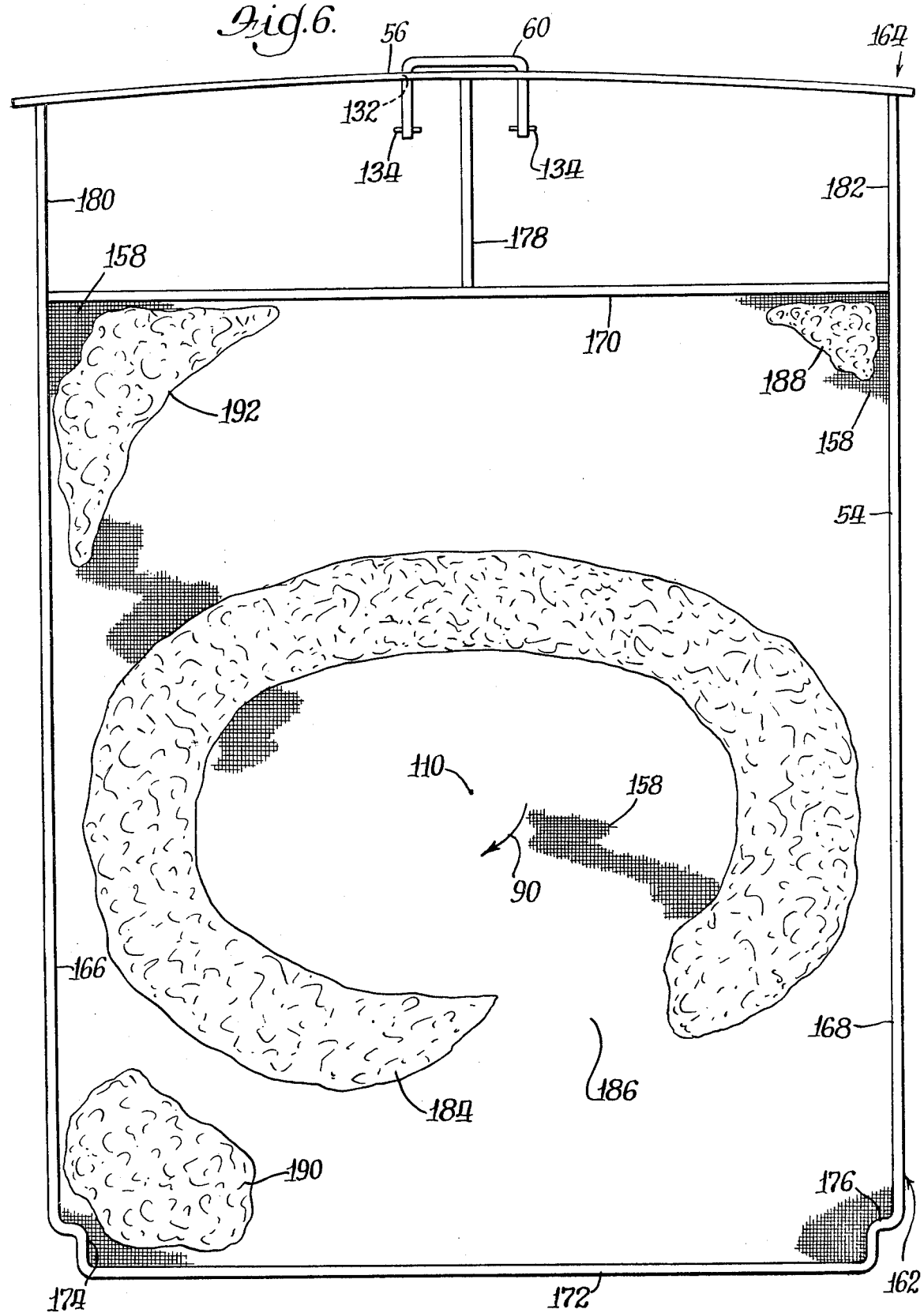
FIG. 6 is a face elevational showing similar to and viewed from the rear the same as in FIG. 3, but with parts removed from the structure to show a shroud screen perse.

More particularly in FIG. 1 of the drawings, the upper front portion of a tractor 10 is shown which is equipped as a crawler bulldozer and which carries front uprights 12 and 14 of a conventional rollover protective structure. A generally rectangular horizontally disposed roof frame of the rollover protective structure has front corners formed at the junctures between a front cross member 16 and generally longitudinally extending, right front and left front side rails 18 and 20.

From the respective front corners of the rollover protective structure and secured thereto by fasteners 22 and 24, two diagonally forwardly convergent front sweeps 26 and 28 extend diagonally horizontally to the point of a sweep bend 30 and then extend diagonally forwardly and downwardly into reception in square anchoring sockets, as exemplified by the right front socket 32, secured to the opposite front corners of a power unit guard and cooling structure 34 for the tractor. A generally horizontal hood 36, generally vertical side sheets, as exemplified by the right side sheet 38, and the guard and cooling structure 34 are mutually joined to define the respective top, sides, and front end of a front engine compartment 40 of the tractor.

Radiator means, generally indicated at 42 and mounted upright in the structure 34, comprises a pivoted cap cover 44 at the top of the right front corner of the structure 34 and defines, with the hood 36, a gapped joint 46 across the top of the hood to allow for clearance as the sheet metal parts deflect. A front hood hold down plate 48 extends across the top width of the hood and includes a horizontal, main section carrying generally vertically disposed depending plate ends at the opposite ends such as the end 50 so as to cover the joint 46 at all points.

The radiator means 42 at the front sides of the engine compartment 40 has its side ends generally falling within vertical planes containing the diagonal front sweeps 26 and 28 and has a transverse disposition with respect to the engine compartment 40 to provide a liquid-to-air heat exchange with a fan induced forwardly directed stream of engine cooling air moving in accordance with the flow arrows 52 in FIG. 1. Novelty herein is believed to reside in the protection afforded the radiator means 42 against debris which could interfere with the heat exchange.

In a plane parallel and closely adjacent to the transverse vertical plane of the radiator means 42, a debris screening grille 54 is suspended in depending relation in the guard and cooling structure 34 behind the radiator means 42 and immediately ahead of the front hood hold down plate 48. An end flange 56 extending from one lateral side of the grille 54 to the other side forms the top cross member thereof and bridges across a narrow, top entry slot 58 in the structure 34 so that the weight of the grille 54 holds it dependingly retained in place by gravity. A retractable grille handle 60 in the flange 56 can be raised, from its solid line position illustrated, into the broken line grasping position 60a providing a central hand hold for transverse removal through the slot 58. The purpose is to follow periodic screen-cleaning cycles.

At the front sides of the engine compartment, the side ends 50 of the hold down plate 48 and the side ends of the radiator means 42 are fairly much coextensive in lateral extent, whereas the side ends of the grille 54 and the terminals of its end flange 56 are comparatively foreshortened. The reason why the grille 54 is laterally less than coextensive with the plate 48 and radiator means 42 is to give the grille 54 more than sufficient clearance to be drawn vertically upwardly by the handle 60 for its removal from between the converging front sweeps 26 and 28.

As shown in FIG. 1 in its air flow pattern for heat exchange purposes in the tractor, fan-induced cooling air moving in the direction of the arrow 62 appearing in FIG. 1 is drawn through side opening screening in the side sheets 38 and thereupon the fan induced air internally flows forwardly in the engine compartment 40 in the indicated direction of the arrow 64. It becomes fan propelled air in passing through the transverse vertical plane 66 of a blower fan, not shown, so as to negotiate the grille 54 and proceed under pressure in the direction of the arrow 68 through the radiator means for forward discharge from the structure 34 in accordance with the arrows 52.

In FIG. 2, a fan shroud 70 having an upstream, generally circular fan opening 72 is secured in the structure 34 to the radiator core 74 in the radiator means 42. The shroud 70 at a point generally intermediate the opening 72 and core 74 carries the debris screening grille 54 which is removable therefrom through a narrow, upwardly opening screen entry slot 76 in the top of the shroud. The grille 54 is actually the intermediate grille between an upstream grille forming a fan guard 78 and a downstream grille forming a radiator guard door 80. Grille wires 82 forming the fan guard 78 trap larger pieces of paper, film, and trash in the fan induced air flow indicated by the direction arrow 64, and the wires 82 also deflect away small chips, blocks, and twigs which tend to be bounced out of the air stream. The guard door 80, on the other hand, deflects brush, branches, and limbs encountered in the path of the tractor so as to protect the radiator core 74 and, at the same time, presents grille holes 84 from which the heated, fan-propelled air exits in the arrow direction 52 after its heat exchange use in the power unit guard and cooling structure 34.

The power unit comprises a liquid-cooled reciprocating engine 86 in the engine compartment 40 which, by an appropriate sheave and V-belt driven by the engine crankshaft, not shown, supportably operates a multibladed blower fan 88 which rotates in the direction of the arrow 90 in FIG. 2. The plane 66 of rotation coincides essentially with the plane of the transverse circular opening 72 in the inlet side of the fan shroud 70. In terms of the referred to path of air flow, it will be seen that the upstream and intermediate grilles 78 and 54 have the fan 88 interposed, whereas the intermediate and downstream grilles 54 and 80 have the radiator core 74 interposed. So the parts vital to heat exchange are fully protected by the guard and cooling structure 34.

A front support frame 92 in the vehicle chassis carries the radiator core 74 by means of customary supports and fasteners such as the fastener 94, and also carries a transversely disposed upright frame forming the radiator guard 96. The radiator core supports, in turn, carry the fan shroud 70, which shroud carries the wire fan guard 78 by means of fasteners, not shown.

Upper and lower tanks 96 and 98 connected to the radiator core 74 provide a respective inlet and outlet 100 and 102 for engine coolant passing through the radiator core. Outlet flow to the engine is in the direction of the arrow 104 in FIG. 2. The engine 86 by a suitable pump, not shown, directs the hot liquid to be cooled in the direction of the arrow 106 through an inlet hose 108 to provide the inlet flow to the top tank 96 of the radiator.

The main air path is indicated by an arrow coinciding with the central axis 110 of a fan shaft 112 which is centered with respect to the radiator. Vertically disposed side walls of the core 74 cooperate with the latter upper and lower tanks 96 and 98 to constrain the air flow in the arrow direction 68 across the tubes and fins, not shown, of the core 74.

At the right top corner of the guard and cooling structure 34 and beneath the hinged cover 44, a hand opening 114 is defined by a riser tube in vertical registry with a cap clamp asembly 116 which is removable for filling the radiator. One of the hold down bars 118 secured to the hold down plate 48 is shown in FIG. 2 in association with its hold down tie rod 120 which is connected to the plate by the bar 118.

In FIG. 2, between the shroud 70 and the fan guard 78, a liner 122 and a liner stiffener 124 intervene in a circular surrounding relation to the shroud inlet opening 72.

In FIG. 3, a left side channel 126 typical of the two radiator side channels has a mounting bracket 128 which is typical of the upper and lower mounting brackets in the channel 126. A rubber mounting 130 interconnects the mounting bracket 128 and the radiator core 74.

The cross member flange 56 of the debris screening grille 54 forms a bridge resting upon the edges of, and covering, the access slot 58 in the structure 34. The handle 60 carried by the cross member plate 56 is of inverted U-shape with legs passing through the two openings 132 in the flange 56. Cross pins 134 in the extremities of the legs afford a connection so that the handle when raised to the operative handle-grasping position 60a can be used to slide the entire grille 54 in channel guides therefor, hereinafter described. Otherwise, the handle occupies the retracted, inoperative position as shown in solid lines rendering the handle 60 substantially flush with the flange 56 and the top of the guard and cooling structure 34.

The hinged cap cover 34 pivots through the transition position as shown by the broken lines 44a into an open position offering full access to the cap assembly 116 through the hand opening 114.

The shroud 70, made in two pieces, is formed of an upper shroud half 136 and a lower shroud half 138 which are stamped pieces that are somewhat alike. The shroud 70 is generally of box shape having top and bottom walls, and side walls of which the wall 140 is typical. The end wall which is the near wall as viewed in FIG. 3 is mostly absent by reason of the circular fan opening 72 mutually defined by the upper and lower shroud halves 136 and 138. At the shroud end opposite to such near end wall, side wall attachment flanges such as those carried by the side wall 140 are secured as by a fastener 142 to the radiator support structure. The top and bottom and side walls of the shroud 70 direct the flow so that all air entering the opening 72 in the near wall is forced to flow out the open end opposite, in the shroud 70.

The inner periphery of the shroud 70 defining the fan opening 72 forms an attachment flange providing a ring of fastener openings 144 for receiving thereover guard attachment clips 146 secured by fasteners such as the fastener 148 so as to clamp the liner and liner stiffener 124 in interposition.

In FIG. 3, the radiator support carries a hold down anchor 150 for the hold down tie rod 120 which is connected thereto by means of a threaded ball and socket joint 152.

In FIGS. 4 and 5, because the size in width of the debris screening grille is less than being coextensive with the full radiator "width" for purposes of ready grille removal, the side walls of the shroud 70 such as the vertical wall 140 carry a medially directed vertically disposed spacer plate 154 to provide offset to the grille guide relative to the vertical plane of the adjacent shroud wall. More particularly, the spacer plate 154 carries an angle member of L-shaped cross section defining therewith a vertical grille channel 156 in which the grille 54 slides vertically. That is, the plate 154 is a wide strip with one longitudinal margin forming one side of the guide channel, and the angle forms the channel bottom and opposite side. Screening 158 in the grille 54 (FIG. 5) filters the air flowing through, and the air flow direction is indicated by arrows 160 in FIGS. 4 and 5. Transversely thereto, the paired guide channels 156 are in aligned registry with the successive screen access slots 76 and 58 (FIG. 2).

In FIG. 6, the screening 158 of a screen 162 in the debris grille 54 is secured along all edges by brazing to round wire forming a generally rectangular main screen frame 164. The wire forms generally longitudinally extending and parallel side members 166 and 168, and a first cross member 170 and a lower, second cross member 172 secured to the longitudinal side members. Reentrant angled bends 174 and 176 join the lower cross member portion terminating at each side of the main frame 164 and the longitudinal side members 166 and 168 at that side, to provide clearance offsets at the frame corners for receiving kickups in the bottom of the shroud 70, not shown.

Two illustrative examples of a satisfactory screening 158 are a mesh size 8, stainless steel wire of 0.032 inch diameter, screen opening 0.093 square inch, providing an open area of 55%, and a mesh size 9, stainless steel wire of 0.028 inch diameter, screen opening 0.083 square inch, providing an open area of 56%.

A single medial longitudinal extension 178 of wire and two laterally disposed longitudinally oriented extensions 180 and 182 are joined to the first cross member 170 in upright disposition thereto. At the top, the extensions 178, 180 and 182 are secured to the cross-member-forming end flange 56 so as to provide the proper downward offset of the screen 162 relative to the top of the hood of the tractor, not shown, and relative to the guard and cooling structure, not shown. The grille end flange 56 is curved on the arc of a circle so as to be downwardly concave and complementary to the transverse curvature of the guard and cooling structure.

With respect to the extended axis 110 of the superimposed fan center line, for a direction of fan rotation clockwise as indicated by the arrow 90, FIG. 6 shows a somewhat typical pattern of trash caught by the screen 162 from air-borne trash and liquids being impinged in the direction of the arrow 160 (FIG. 4). A rather wide ring 184 of trash forms generally concentric with and close to the extended fan axis 110 and is interrupted at the bottom by a short circumferential gap 186 in the ring which has an angular measurement of about 30°. The rest of the trash is distributed among a rather small fringe area 188 in the upper right corner of the screen 162 as viewed in FIG. 6, a large area 190 of about four times the size of such small fringe area of trash is collected in the lower left corner, and a somewhat arcuate area 192 of trash of a size equivalent to the other large area 190 accumulates in the upper left corner of the screen as viewed in FIG. 6.

In FIG. 6 because the deposits conform to a rather consistent pattern, the predominant quantities of air-borne trash and minor quantities of air-borne liquids impinge upon trash areas occupied by the somewhat absorbent debris already there, which tends to soak up the liquids without transmitting them except in minimal quantities onto the radiator core, not shown.

Clean-out of trash and brush is done by the driver as often as the stringency of operating conditions requires, and the main preparation for clean-out is to shut off the engine. For attending to the downstream grille 80, the operator merely alights to the ground and, by hand, cleans out all brush lodged in the apertures 84 in FIG. 2. Also in FIG. 2, the side sheets, not shown, of the hood are opened and then the operator by hand removes the larger paper and trash from the grille wires 82 on which they are collected in the engine compartment on the fan guard 78. Finally, according to FIG. 2, the operator upwardly slides the intermediate grille 54 from between the front sweeps, not shown, so as to remove it to the ground. Thereafter, trash as illustrated in FIG. 6 on the intermediate grille 54 is removed by shaking, hosing down, brushing, or compressed air directed through the screening 158 in a direction blowing away all clinging trash in the pattern.

We are aware that hinged radiators have heretofore been proposed for tractors, and that they enable the radiator to be swung out from the radiator guard and cooling structure. In some instances, however, grille work must first be removed, a hot radiator must next be handled in order to free it for swinging out, and then the hot radiator must be washed or otherwise cleaned off, all of which can introduce comparative inconvenience when considered in connection with the presently simplified cleaning technique.

Variations within the spirit and scope of the invention described are equally comprehended by the foregoing description.

What is claimed is:

1. In a power unit guard and cooling structure incorporating heat exchange means disposed so as to be exposed to a stream of fan-blown-air by confronting same at a point longitudinally along the path thereof,
    an improved automotive type radiator-fan shroud for interposition to direct air and at the same time to remove air-borne trash therefrom; and
    defining a generally circular, through opening adapted to surround a fan; said shroud including radiator-attachment means, the fan having air-directing blades for moving air through said opening under pressure and longitudinally therefrom under pressure in a path through the plane of said attachment means;
    said shroud including therein an air screen across said path which is generally coextensive with the transverse dimensions of the shroud and which is interposed in place therein so that the plane of the air screen is directly between the planes respectively of the attachment means and of the fan opening;
    said shroud also including essentially straight side walls, and essentially straight guides affixed thereto for the screen, so as with respect to said longitudinal path to be transversely disposed similarly to the air screen and to hold the latter in its place.

2. In an automotive vehicle having an engine compartment terminated by heat exchange means which is exposed to an outgoing stream of fan-blown-air and which confronts same at a point in the engine compartment longitudinally along the path of said out going stream, an improved automotive type fan shroud for interposition to direct blown-in air under pressure and at the same time to remove air-borne trash therefrom, and having side walls jointed to top and bottom walls so as to impart a general rectangular parallel piped box shape to the shroud;

an end wall carrying the side walls and defining a central fan opening in the shroud in receiving relation to blown-in air therein;

radiator attachment flanges carried by the side walls on terminals of the latter remote to the end wall;

a screen slot in the top wall parallel to the end wall, each end of the slot being foreshortened with respect to the corresponding end of the top wall;

screen guide channels laterally spaced apart to one another in the shroud; and spacers connected to the shroud side walls holding the screen guide channels offset from the planes of the side walls and in aligned registry with the screen slot.

3. The invention of claim 2, each of the spacers characterized by a wide strip secured along one longitudinal margin to the adjacent side wall and forming with its other longitudinal margin one side of the associated screen guide channel; and a generally L-shaped angle member secured to said other longitudinal margin of the strip to form the bottom and opposite side of the screen guide channel.

4. In an automotive vehicle having an engine compartment terminated by a heat exchanger which is exposed to an out blowing air stream and which confronts same at a point in the engine compartment along the path of said air stream, an improved automotive type fan shroud for interposition to direct blown-in air under pressure and at the same time to remove air-borne debris therefrom, and having:

a hanging, removable debris-screening grille with a screen having a generally rectangular main frame, said frame having generally longitudinal sides and vertically spaced apart first and second cross members transversely across same so as to support screening in the screen on all sides;

plural longitudinal extensions joined to the first cross member disposed so that at their top they extend vertically away therefrom;

a top cross member secured to the frame at the top of the longitudinal extension comprising a slot-covering flange from which the frame is to be suspended when hung; and a retractable handle in the cross-member-forming frame flange.

5. The invention of claim 4, characterized by:

reentrant angled junctions between the second cross member portion termination at each side of the main frame and the longitudinal side at that side, to provide clearance offsets at the frame corners adjacent the second cross member.

6. The invention of claim 1, the shroud characterized by additionally including:

a side slot in another side thereof registering with the screen guides, and providing an outside access opening for affording transverse sliding of the screen in the guides in connection with periodic screen-cleaning cycles.

* * * * *